United States Patent
Damnjanovic

(10) Patent No.: US 9,155,053 B2
(45) Date of Patent: Oct. 6, 2015

(54) METHODS AND APPARATUSES FOR POWER CONTROL IN WIRELESS COMMUNICATIONS

(71) Applicant: QUALCOMM Incorporated, San Diego, CA (US)

(72) Inventor: Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 18 days.

(21) Appl. No.: 13/898,269

(22) Filed: May 20, 2013

(65) Prior Publication Data

US 2014/0080538 A1 Mar. 20, 2014

Related U.S. Application Data

(63) Continuation of application No. 12/142,121, filed on Jun. 19, 2008, now Pat. No. 8,446,849.

(60) Provisional application No. 60/945,325, filed on Jun. 20, 2007.

(51) Int. Cl.
 *H04W 52/02* (2009.01)
 *H04W 80/04* (2009.01)
 (Continued)

(52) U.S. Cl.
 CPC ............ *H04W 52/34* (2013.01); *H04W 52/146* (2013.01); *H04W 52/54* (2013.01); *H04W 52/58* (2013.01)

(58) Field of Classification Search
 CPC . H04W 52/02; H04W 52/0216; H04W 80/04; H04W 88/06; H04W 28/04; H04W 72/04; H04W 52/24; H04W 52/50

USPC .......................... 370/311, 328, 329; 455/522
See application file for complete search history.

(56) References Cited

U.S. PATENT DOCUMENTS

| 5,604,730 A | 2/1997 | Tiedemann, Jr. |
| 6,275,478 B1 | 8/2001 | Tiedemann, Jr. |

(Continued)

FOREIGN PATENT DOCUMENTS

| CN | 1320307 | 10/2001 |
| EP | 1871028 A1 | 12/2007 |

(Continued)

OTHER PUBLICATIONS

International Search Report and Written Opinion—PCT/US2008/067754, International Search Authority—European Patent Office—Feb. 27, 2009.

(Continued)

*Primary Examiner* — Ronald B Abelson
(74) *Attorney, Agent, or Firm* — Liem T. Do

(57) ABSTRACT

Downlink power control commands are mapped to resources used for uplink communications within a wireless communication system. A base station receives communications from UEs and determines the resources used by the UEs for those transmissions on the uplink which are transmitted at non-optimum power levels. Power control messages are formulated wherein the location of the power control commands is mapped to particular resources used by the UEs for their uplink transmissions. This facilitates the base station to dynamically assign resources for the power control commands while permitting the UEs to decode the power control messages to adjust their power accordingly.

23 Claims, 14 Drawing Sheets

(51) Int. Cl.
*H04W 88/06* (2009.01)
*H04W 28/04* (2009.01)
*H04W 72/04* (2009.01)
*H04W 52/24* (2009.01)
*H04W 52/50* (2009.01)
*H04W 52/34* (2009.01)
*H04W 52/14* (2009.01)
*H04W 52/54* (2009.01)
*H04W 52/58* (2009.01)

(56) References Cited

U.S. PATENT DOCUMENTS

| | | | |
|---|---|---|---|
| 6,567,459 B1* | 5/2003 | Hakkinen et al. | 375/132 |
| 8,446,849 B2 | 5/2013 | Damnjanovic | |
| 2001/0017848 A1 | 8/2001 | Tiedemann, Jr. | |
| 2002/0018453 A1 | 2/2002 | Yu et al. | |
| 2002/0123337 A1 | 9/2002 | Dharia et al. | |
| 2003/0026219 A1 | 2/2003 | Moon et al. | |
| 2004/0233870 A1 | 11/2004 | Willenegger et al. | |
| 2006/0002332 A1* | 1/2006 | Diaz Cervera et al. | 370/328 |
| 2006/0003696 A1 | 1/2006 | Diaz et al. | |
| 2006/0262840 A1* | 11/2006 | Wang et al. | 375/221 |
| 2007/0178930 A1 | 8/2007 | Xiao et al. | |
| 2008/0045259 A1* | 2/2008 | Shen et al. | 455/522 |
| 2008/0108379 A1* | 5/2008 | Cho et al. | 455/522 |
| 2008/0171520 A1* | 7/2008 | Steer | 455/77 |
| 2009/0185577 A1 | 7/2009 | Kishiyama et al. | |
| 2011/0010705 A1 | 1/2011 | Adams et al. | |

FOREIGN PATENT DOCUMENTS

| | | |
|---|---|---|
| EP | 2033338 A1 | 3/2009 |
| JP | 10503337 | 3/1998 |
| JP | 2002508620 A | 3/2002 |
| JP | 2002520943 A | 7/2002 |
| TW | 453058 B | 9/2001 |
| TW | 453059 B | 9/2001 |
| WO | 9603813 A1 | 2/1996 |
| WO | WO-9929048 | 6/1999 |
| WO | 9949595 A1 | 9/1999 |
| WO | 0003495 | 1/2000 |
| WO | 2006109436 A1 | 10/2006 |
| WO | 2007145495 A1 | 12/2007 |

OTHER PUBLICATIONS

NTT Docomo: "Intra-Node BTPC for Non-Scheduled Data Transmission in E-UTRA Uplink" 3GPP Draft; R1-072419 UL TPC for Non-Scheduled Data, 3rd Generation Partnership Project (SGPP), Mobile Competence Centre; 650,Route Des Lucioles; F-06921 Sophia-Antipolis Cedex ; France, vol. tsg-ran\WGI-RLI\TSGRI_49\Docs, no. Kobe, Japan; May 2, 2007, XP050106145.
Taiwan Search Report—TW097123263—TIPO—Oct. 26, 2011.

* cited by examiner

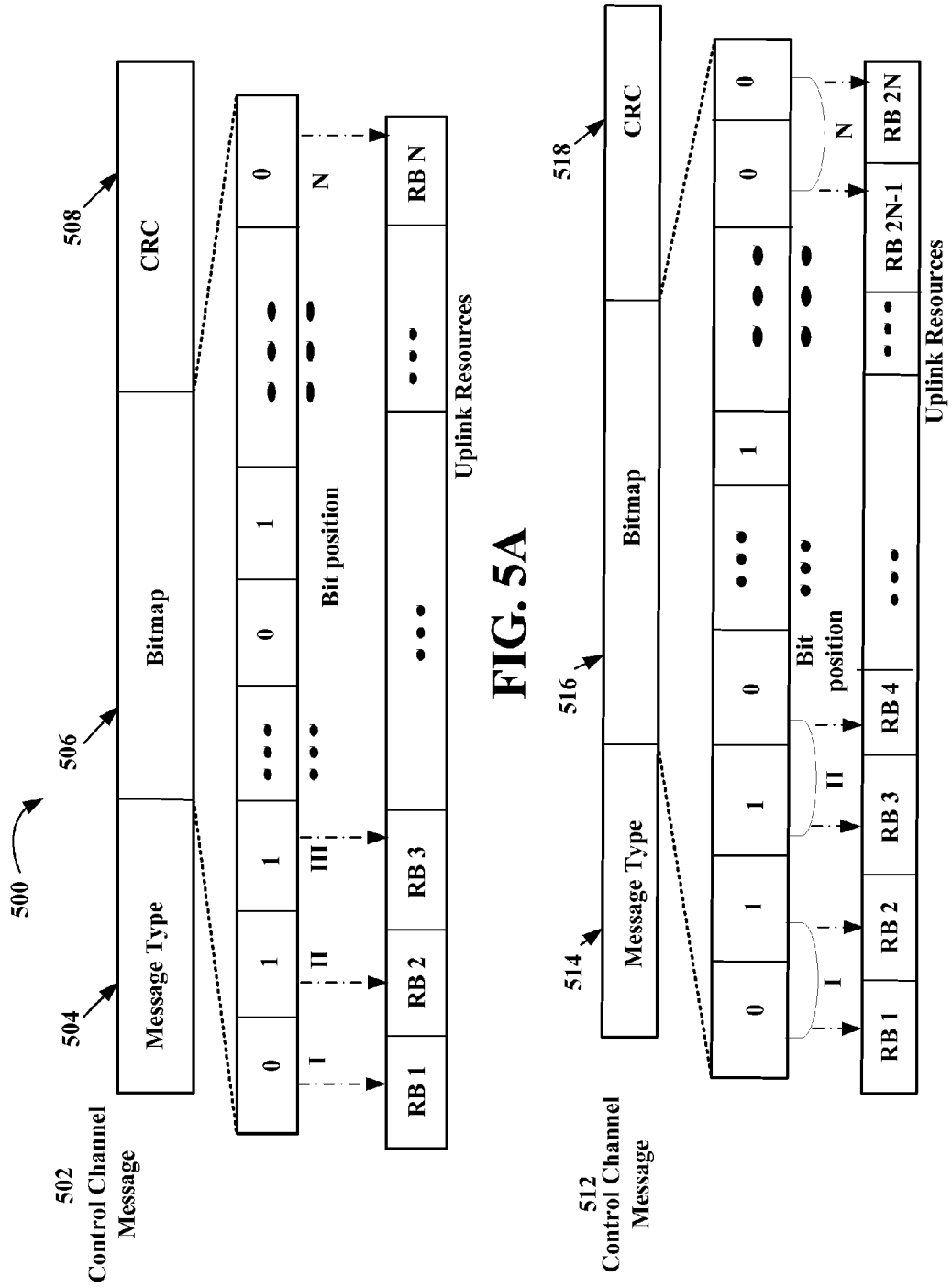

METHODS AND APPARATUSES FOR POWER CONTROL IN WIRELESS COMMUNICATIONS

CROSS-REFERENCE TO RELATED APPLICATION(S)

The present Application for Patent is a Continuation of U.S. patent application Ser. No. 12/142,121, filed Jun. 19, 2008, entitled "METHODS AND APPARATUSES FOR POWER CONTROL," which claims the benefit of U.S. Provisional Patent Application Ser. No. 60/945,325 filed on Jun. 20, 2007 and entitled "METHODS AND APPARATUSES FOR POWER CONTROL," all of which are assigned to the assignee hereof and hereby expressly incorporated by reference herein in their entirety.

BACKGROUND OF THE INVENTION

Wireless communication systems are widely deployed to provide various types of communications such as voice, data, video, etc. These systems may be multiple-access systems capable of supporting communication with multiple access terminals by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems. Typically, a wireless communication system comprises several base stations, wherein each base station communicates with a mobile station using a forward link and each mobile station (or access terminal) communicates with base station(s) using a reverse link.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out (SISO), multiple-in-signal-out (MISO) or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the eNode B to extract transmit beamforming gain on the forward link when multiple antennas are available at the eNode B.

When a user generates data for transmission, a service request is conveyed to the base station or an eNode B via established communication channels and in turn the base station assigns resources contingent upon time, bandwidth requirements/availability or service options of the user. The access terminal of the user or user equipment (UE) accordingly utilizes the assigned resources for communicating with the eNode B via the uplink. However, various factors such as power constraints, signal attenuation, obstacles, etc. can lead to fluctuations in transmission from the UE. As a result, the eNode B transmits power control signals to the UE based on the transmissions received from the UE thereby facilitating the UE to transmit with optimal power. However, the resources assigned for transmitting power control commands are assigned statically so that even if a UE is not transmitting or transmitting at optimum power levels, resources for power control commands remain assigned thereby leading to a non-optimal use of resources within the wireless communication system.

SUMMARY OF THE INVENTION

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In accordance with an aspect, a method for controlling power within a wireless communication system is disclosed. Upon receiving one or more uplink communications it is determined if any of the received communications have been transmitted at non-optimum power levels. If yes, then the UEs transmitting the communications at non-optimum power levels and the resources employed by the UEs for the non-optimal uplink communications are identified. Accordingly, power control messages for such UEs are generated. In a more detailed aspect, position of commands for controlling power within the messages is mapped to the resources employed by the respective UEs. The power control messages thus generated are subsequently transmitted to the UEs.

In a further aspect, power control messages can comprise a bitmap that communicates the power control commands wherein the bits within the bitmap represent the power control commands and location of the bits within the bitmap is mapped to the resources employed by the respective UEs. The number of bits for controlling power of an UE is associated with number of resources utilized by the UE for its uplink communications. In accordance with different aspects, a common power control message can be transmitted to a plurality of UEs or alternatively individual power control messages comprising the power control bits can be sent to each of the UEs separately. If at least one of the UEs is transmitting a plurality of data streams at different frequencies then the power control messages can individually adjust power of one or more resource blocks utilized by the data streams being transmitted at non-optimum power levels.

In another aspect, the resources assigned to the UEs for their uplink communications can be indexed. The power control messages transmitted to the UEs can comprise the indexing information in addition to the power control commands. This facilitates grouping UEs based at least on their radio conditions so that a group power control message can be transmitted to UEs having similar radio conditions. This facilitates dynamic signaling wherein only those UEs that require power correction receive power control commands while no resources are wasted in sending redundant communications to UEs already transmitting at optimum power levels.

Another aspect relates to an apparatus for conveying power control information within a communication system. The apparatus comprises a receiver that receives one or more communications from one or more UEs. A processor within the apparatus generates power control messages for those communications transmitted at non-optimum power levels. The messages are created such that the location power control commands within them are mapped to the resources utilized by the uplink communications. A transmitter subsequently transmits the power control messages to the UEs. The apparatus also comprises a memory that stores information associated with the power control commands or the resources.

In different aspects, a power control message can comprise a plurality of power control commands associated with a plurality of UEs or a plurality of power control messages can be transmitted separately to each of the plurality of UEs. Location of the power control commands within the power control message is mapped to resources utilized by the UEs for their uplink communications. Another aspect relates to UEs utilizing a plurality of resources for transmitting on the uplink. In this aspect, the power control message can comprise a plurality of power control commands whose position within the power control message is mapped to the plurality of resources utilized by a UE. Yet another aspect is associated with UEs transmitting a plurality of the communications at a plurality of frequencies. In accordance with this aspect, the processor generates a power control message for the plurality of communications received from a UE wherein the power control message comprises power control commands for one or more of the communications being transmitted at different frequencies.

The apparatus also facilitates a more dynamic signaling wherein the resources utilized by the UEs are indexed and the power control messages can comprise indexing information associated with the resources along with the power control commands. This facilitates grouping UEs based at least on their respective radio conditions and transmitting a common group power control messages to only those UEs requiring power corrections.

In another aspect, the subject innovation discloses a computer program product comprising a computer-readable medium comprising: code for causing at least a computer to receive one or more uplink communications; code for causing at least a computer to determine if the communications have been transmitted at optimum power levels; code for causing at least a computer to determine one or more resources employed by one or more UEs for the non-optimal uplink communications for uplink communications transmitted at non-optimal power levels; code for causing at least a computer to generate one or more power control messages for the UEs wherein position of control commands for controlling power is mapped to the one or more resources employed by the respective UEs; and code for causing at least a computer to transmit the power control messages to the one or more UEs.

A apparatus for communicating power control information is disclosed in accordance with yet another aspect. The apparatus comprises a means for receiving uplink communications from UEs. Means for analyzing the received communications, also comprised within the system, identify communications received at non-optimal power levels. Accordingly, means for transmitting transmit power control messages to the UEs wherein location of at least one power control command within the messages is mapped to at least one resource utilized by the at least one UE for the non-optimal uplink communications.

In yet another aspect, a method of receiving power control commands is disclosed. The method comprises transmitting uplink communications, and receiving at least one power control message on the downlink. The power control message comprises at least one power control command wherein location of the power control command is mapped to the resources utilized in the uplink communications. Based on its location within the message, the power control command is identified and power levels of the one or more uplink communications are corrected in accordance with the received power control command.

An apparatus for adjusting transmission power levels within a communication system is disclosed in accordance with this aspect. The apparatus comprises a transmitter that transmits one or more uplink communications. Some of the uplink communication may be transmitted at non-optimal power levels. Accordingly, a receiver receives at least one power control message wherein location of at least one power control command within the at least one power control message is mapped to one or more resources utilized by the non-optimal uplink communications. A processor also comprised within the apparatus controls power levels of the transmitter based on the received power control command.

Another aspect is associated with a computer program product comprising a computer-readable medium comprising: code for causing at least a computer to transmit one or more uplink communications; code for causing at least a computer to receive at least one power control message on downlink wherein location of at least one power control command is mapped to at least one resource utilized in the uplink communications; and code for causing at least a computer to adjust power levels of the one or more uplink communications in accordance with the at least one power control command.

An apparatus for adjusting power within a wireless communication system is disclosed in accordance with this aspect. The apparatus comprises means for transmitting, means for receiving and means for adjusting power levels. The means for transmitting transmits one or more uplink communications. Means for receiving facilitates receiving at least one power control message on downlink wherein location of at least one power control command is mapped to at least one resource utilized in the uplink communications. Accordingly, means for adjusting corrects power levels of the one or more uplink communications in accordance with the at least one power control command.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 5A illustrates a schematic diagram of a power control message transmitted to a plurality of access terminals that receive power control commands in accordance with an aspect.

FIG. 5B relates to another aspect wherein more than one resource block is employed by the access terminal for transmission of its uplink communications.

DESCRIPTION OF THE INVENTION

Figure 1:
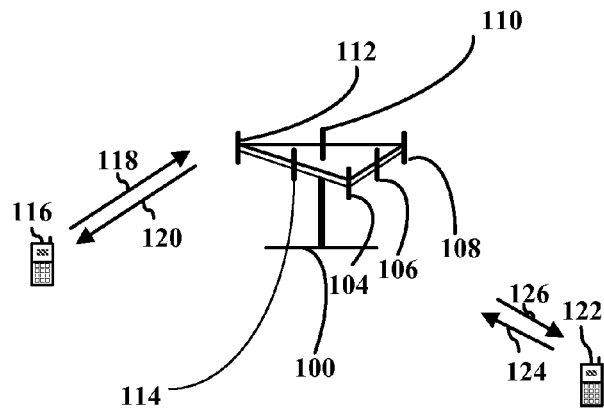
FIG. 1 illustrates a multiple access wireless communication system according to one embodiment.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident however, that such embodiment(s) may be practiced without these specific details. In other instances, well-known structures and devices are shown in block diagram form in order to facilitate describing one or more embodiments. As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (eNode B or UE) is receiving and processing data received on a given channel.

Various aspects can incorporate inference schemes and/or techniques in connection with transitioning communication resources. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events, or decision theoretic, building upon probabilistic inference, and considering display actions of highest expected utility, in the context of uncertainty in user goals and intentions. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, various aspects are described herein in connection with a subscriber station. A subscriber station can also be called a system, a subscriber unit, mobile station, mobile, remote station, access point, eNode B, remote terminal, access terminal, user terminal, user agent, a user device, mobile device, portable communications device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An eNode B 100 includes multiple antenna groups, wherein a first group includes antennas 104 and 106, another includes 108 and 110, and an additional group includes 112 and 114. In FIG. 1, only two antennas are shown for each antenna group, however, more or fewer antennas may be utilized for each antenna group. UE (user equipment) or AT (access terminal) 116 is in communication with antennas 112 and 114, where antennas 112 and 114 transmit information to UE 116 over forward link 120 and receive information from UE 116 over reverse link 118. UE 122 is in communication with antennas 106 and 108, where antennas 106 and 108 transmit information to UE 122 over forward link 126 and receive information from UE 122 over reverse link 124. In a FDD system, communication links 118, 120, 124 and 126 may use different frequencies for communication. For example, forward link 120 may use a different frequency than that used by reverse link 118. Each group of antennas and/or the area in which they are designed to communicate is often referred to as a sector of the access point or eNode B. In the embodiment, antenna groups are each designed to communicate to UEs in a sector within the areas covered by eNode B 100.

In communication over forward links 120 and 126, the transmitting antennas of eNode B 100 utilize beamforming in order to improve the signal-to-noise ratio of forward links for the different UEs 116 and 124. Also, an eNode B using beamforming to transmit to UEs scattered randomly through its coverage area causes less interference to UEs in neighboring cells than an eNode B transmitting through a single antenna to all its UEs.

An eNode B may be a fixed station used for communicating with the terminals and may also be referred to as an access point, a Node B, an enhanced Node B (eNode B) or some other terminology. An access terminal (AT) may also be called a user equipment (UE), a wireless communication device, terminal, or some other terminology.

Figure 2:
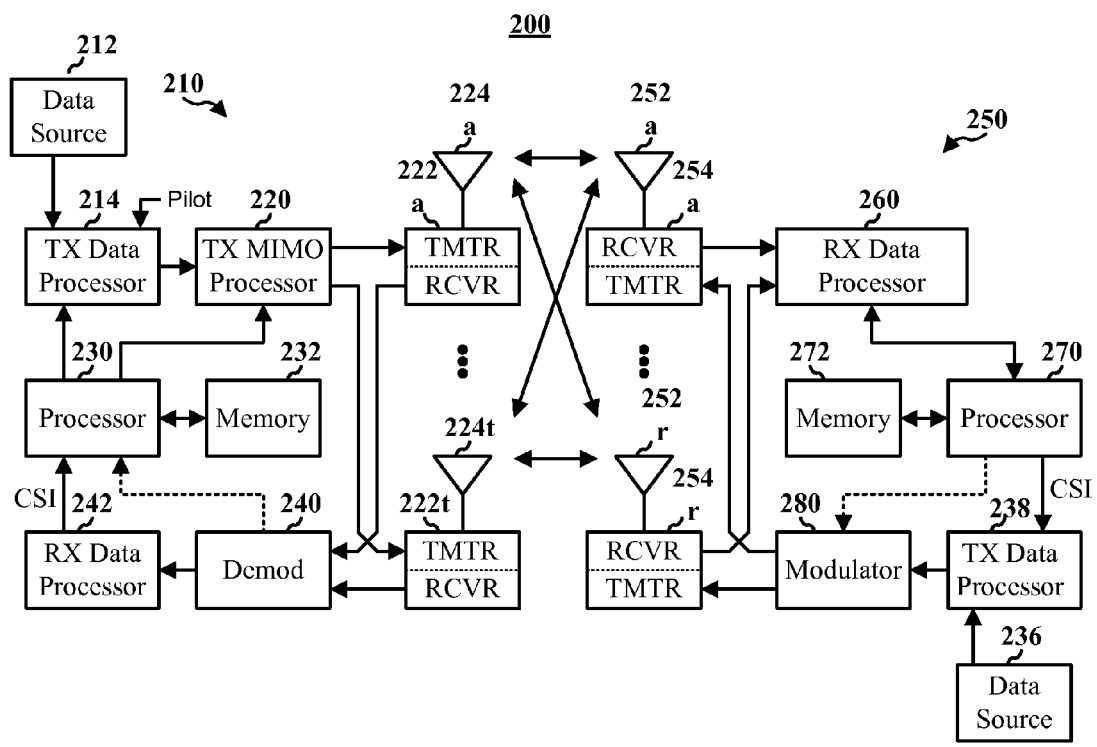
FIG. 2 is a block diagram of an embodiment of an eNode B and an access terminal (or a UE) in a MIMO system.

FIG. 2 is a block diagram of an embodiment of an eNode B 210 and a access terminal (AT) or user equipment (UE) 250 in a MIMO system 200. At the eNode B 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At the UE 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The received symbols or other information can be stored in an associated memory 272. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at the eNode B 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. Information received on the reverse link can be stored in an associated memory 232. The reverse link message is then processed by a TX data processor 238, which also receives traffic data for a number of data streams from a data source 236, modulated by a modulator 280, conditioned by transmitters 254a through 254r, and transmitted back to transmitter system 210.

At the eNode B 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS. Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Channel (DL-SCH) and a Paging Channel (PCH), the PCH for support of UE power saving (DRX cycle is indicated by the network to the UE), broadcasted over entire cell and mapped to PHY resources which can be used for other control/traffic channels. DL transport channel associated with MBMS is Multicast Channel (MCH) The UL Transport Channels comprises a Random Access Channel (RACH), Uplink Shared Data Channel (UL-SDCH) and plurality of PHY channels. The PHY channels comprise a set of DL channels and UL channels.

Figure 3:
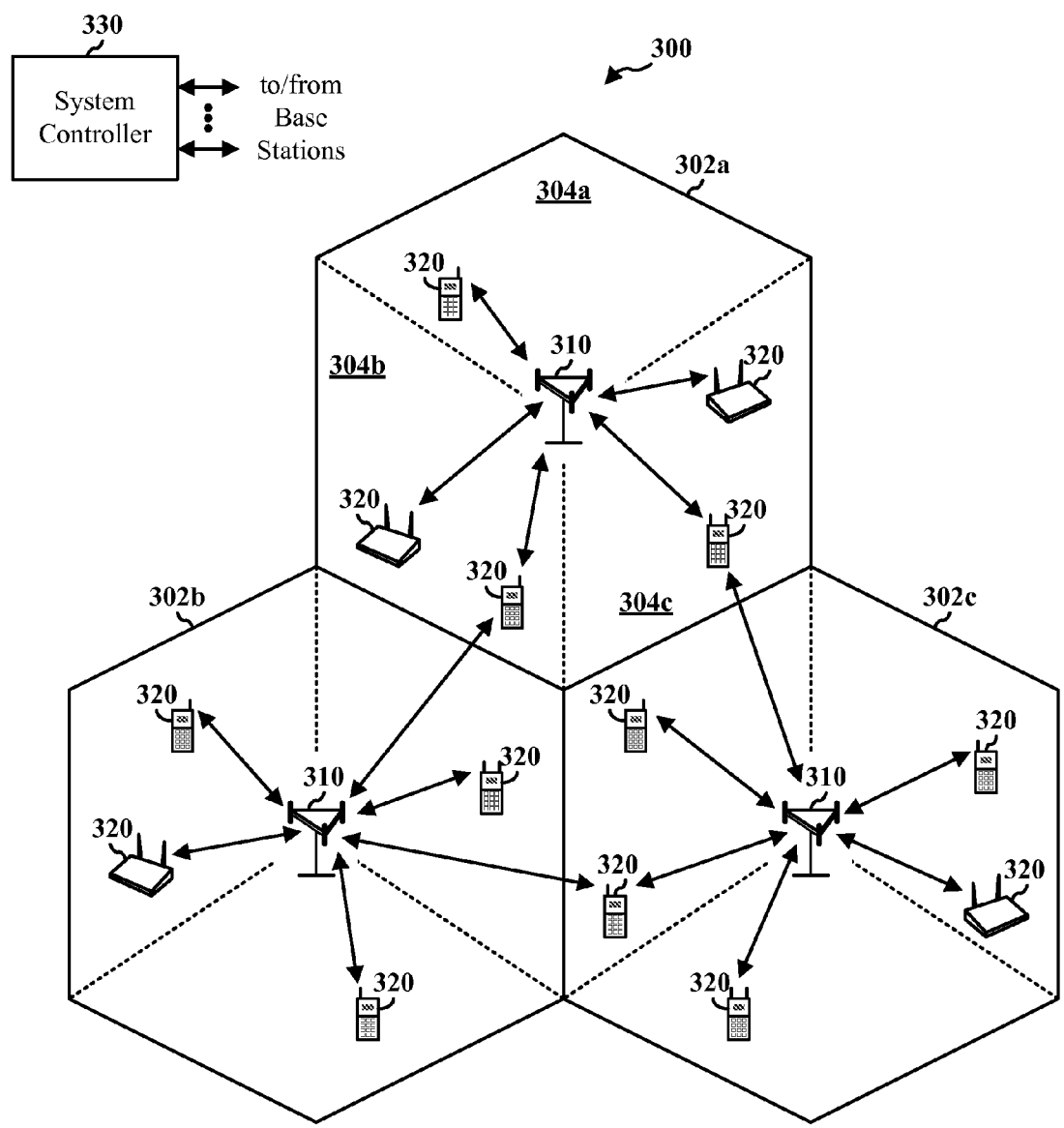
FIG. 3 is an illustration of a wireless multiple-access communication system in accordance with various aspects described herein.

The DL PHY channels and signals comprises:
Reference signal (RS)
Primary and Secondary Synchronization Signals (PSS/SSS)
Physical Downlink Shared Channel (PDSCH)
Physical Downlink Control Channel (PDCCH)
Physical Multicast Channel (PMCH)
Physical HARQ Indicator Channel (PHICH)
Physical Control Format Indicator Channel (PCFICH)
    The UL PHY Channels comprises:
Physical Random Access Channel (PRACH)
Physical Uplink Control Channel (PUCCH)
Channel Quality Indicator (CQI)
Precoding Matrix Indicator (PMI)
Rank Indicator (RI)
Scheduling request (SR)
Uplink ACK/NAK
Physical Uplink Shared Channel (PUSCH)
Sounding Reference Signal (SRS)
    In an aspect, a channel structure is provided that preserves low PAR (at any given time, the channel is contiguous or uniformly spaced in frequency) properties of a single carrier waveform.
    For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SN Sequence Number
SUFI SUper FIeld TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel
PUCCH physical uplink control channel
PUSCH physical uplink shared channel FIG. 3 is an illustration of a wireless multiple-access communication system 300 in accordance with various aspects. In one example, the wireless multiple-access communication system 300 includes multiple eNode Bs 310 and multiple UEs 320. Each eNode B 310 provides communication coverage for a particular geographic area 302 (e.g., 302a, 302b, 302c). The term "cell" can refer to an eNode B and/or its coverage area depending on the context in which the term is used. To improve system capacity, an access terminal coverage area may be partitioned into multiple smaller areas, e.g., three smaller areas 304a, 304b, and 304c. Each smaller area is served by a respective eNode B. The term "sector" can refer to an eNode B and/or its coverage area depending on the context in which the term is used. For a sectorized cell, the eNode Bs for all sectors of that cell are typically co-located within the base station for the cell. The signaling transmission techniques described herein may be used for a system with sectorized cells as well as a system with un-sectorized cells. For simplicity, in the following description, the term "base station" or eNode B is used generically for a station that serves a sector as well as a station that serves a cell.

Terminals or UEs 320 are typically dispersed throughout the system, and each UE may be fixed or mobile. A terminal may also be called, and may contain some or all of the functionality of, a mobile station, a user equipment, and/or some other device. A terminal may be a wireless device, a cellular phone, a personal digital assistant (PDA), a wireless modem card, and so on. A terminal may communicate with zero, one, or multiple base stations on the forward and reverse links at any given moment.

For a centralized architecture, a system controller 330 couples to APs 310 and provides coordination and control for these base stations. System controller 330 may be a single network entity or a collection of network entities. For a distributed architecture, the APs 310 may communicate with one another as needed.

One or more aspects of a wireless communication system design are described that support full & half duplex FDD (Frequency Division Duplex) and TDD (Time Division Duplex) modes of operation, with support for scalable bandwidth. However, this need not be the case, and other modes may also be supported, in addition to, or in lieu of, the previous modes. Further, it should be noted that the concepts and approaches herein, need not be used in conjunction with any other of the concepts or approaches described herein.

As detailed supra, uplink power control can have considerable impact on the operation of a RN (radio network) as signals are affected by various factors such as location of the AT from an eNode B or atmospheric effects or other factors. The attenuation experienced by uplink signals due to these various factors can be compensated by constantly transmitting them at a high power level. However, this may result in undesirable consequences such as high level of interference between users or wastage of resources if at least some of the factors causing such attenuation are not present. As a result, it is desirable to control the power at which uplink signals are transmitted by an AT. This is generally achieved by transmitting power control commands to the AT by a serving base station through its control channel transmissions. The process of controlling power of uplink transmissions can either be an aperiodic message based procedure or it may occur periodically.

Figure 4:
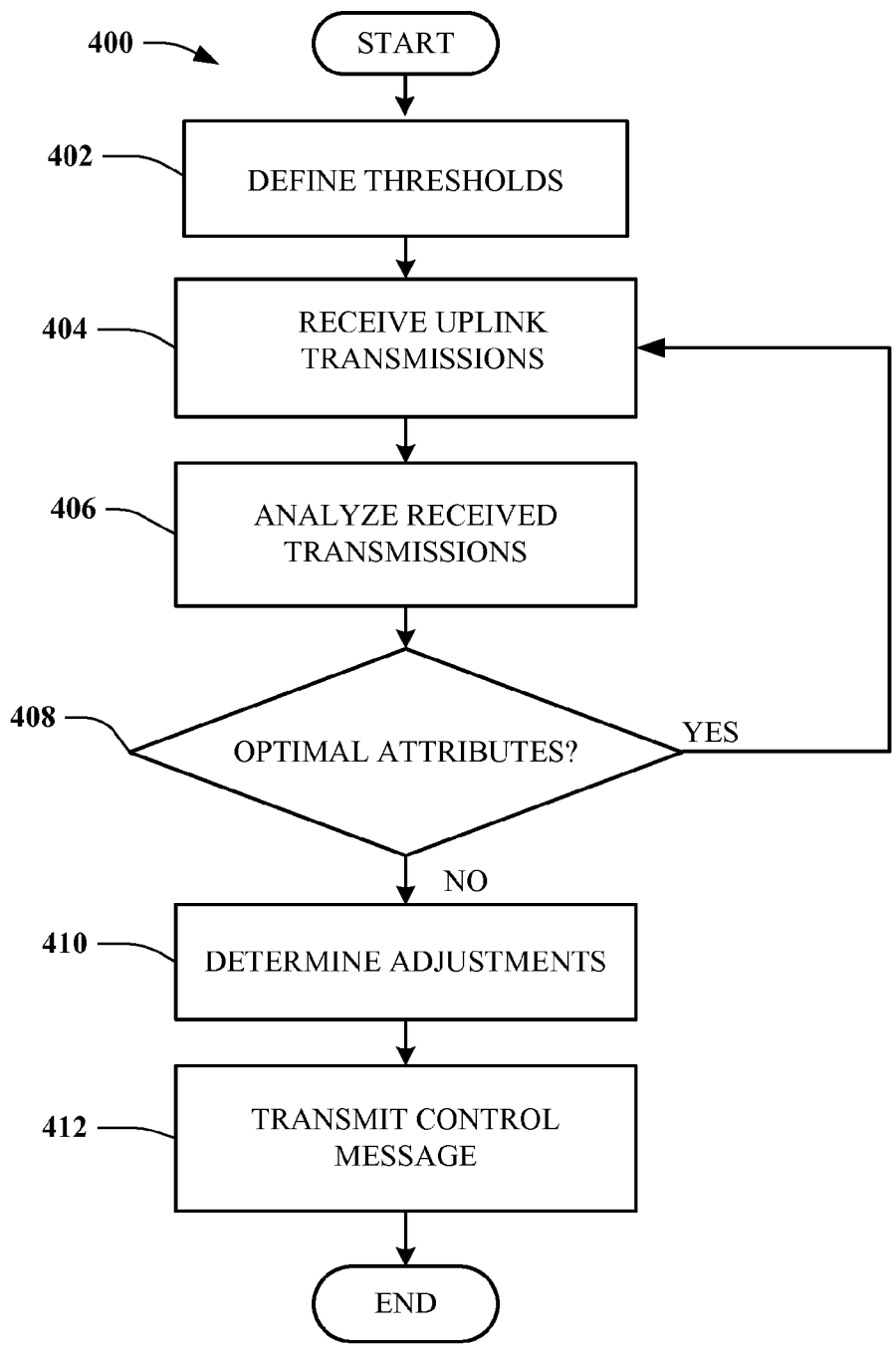
FIG. 4 is a flow chart detailing a closed loop power control of UE uplink transmissions.

FIG. 4 is a flow chart 400 detailing a closed loop power control of uplink transmissions. The procedure begins at 402 wherein thresholds can be defined for one or more attributes associated with uplink transmissions received from an UE at a base station. For example, SNR (Signal-to-Noise Ratio) can be an attribute detected from the UE uplink communications which has a threshold defined for optimal transmissions. At 404, uplink transmissions are received from an UE at the base station. These transmissions may relate to resource requests, data/voice transmissions or other communications. The received transmissions are analyzed at 406 in order to detect requisite attributes such as SNR at 406. At 408, it is determined if the uplink communications have optimal attributes. If yes, the base station continues to receive transmissions without affecting the power levels of the UE. If at 408 it is concluded that the transmissions received from the UE are non-optimal, at 410 the attributes are compared with the predefined threshold in order to determine an appropriate adjustment that should be made to the attributes to set them at optimal levels. Based at least on the conclusions derived at 410 appropriate power control messages are transmitted at 412. For example, if one of the attributes measured is the SNR of the uplink signal, upon comparison with a predefined SNR threshold an appropriate adjustment of power level is determined in order to facilitate transmissions at the optimal SNR. Accordingly, if at 410 it is determined that the SNR is less than the predefined threshold it can be concluded that the signal should be transmitted at a higher power level. Therefore a power control command is sent to the UE to transmit the signals at higher power levels. If at 410, it is determined that the SNR of the received signal is not less than the predefined threshold, it is concluded that the signal has an SNR greater than the threshold and accordingly an power control command is sent to the UE at 412 to decrease the power level of the uplink transmissions. It can be appreciated that the procedure detailed supra is just one methodology of controlling power at the UE. Other methods are possible for example, an UE can be programmed to adjust its own power level via measuring the attributes of a downlink signal etc.

Accordingly, resources are assigned by a serving base station to transmit power control commands to an UE in order to facilitate the terminal to transmit uplink communications at an optimal level. These resources are generally assigned statically per user (or per UE) and therefore remain assigned irrespective of whether or not the UE is transmitting. This leads to a non-optimal use of communication system resources. Various aspects discussed herein mitigate such wastage of resources by associating downlink power control commands to resources used for uplink transmissions thereby leading to a more dynamic assignment of resources for power control signaling.

FIG. 5A illustrates a schematic diagram 500 of a power control message transmitted to a plurality of UEs I, II, . . . N that receive power control commands mapped in a manner that is associated with the resources on which the respective UEs transmit their uplink communications. In the figure, 502 is a control channel message carrying power control bits for the terminals I, II, . . . N. In this embodiment, a control channel message 502 can comprise a message type field 504, a bitmap 506, and a cyclic redundancy check (CRC) field 508. The message type field 504 carries a specific value to identify this message as a control channel message. Different messages may be assigned different message type values. The bitmap field 506 comprises a bitmap that carries power control bits for each of the associated UEs. Accordingly, the control channel message 502 is transmitted with N bits each bit carrying a power control message for each of the I, II . . . N UEs.

In a further aspect, the location of these power control bits in the bitmap is associated with the resources used by each of the I, II, . . . N UEs for their uplink transmissions. Accordingly, if UE I is transmitting uplink communications on resource block 1 (RB 1), the power control bit meant for UE I would be the first bit 0 in the bitmap. Similarly, if UE II is transmitting uplink communications on resource block (RB) 2, the second bit in the bitmap 504 would be the power control bit for the terminal II. In accordance with an aspect, a resource block can be made up of resource elements. For example, a resource block can be comprised of predetermined resource elements such as a specified number of consecutive SC FDMA symbols in time domain and a specific number of consecutive subcarriers in the frequency domain. Thus, if the UE N is transmitting on the Nth resource block, the Nth bit in the bitmap field would be the power control bit for the UE N. Hence, the location of the power control bits in the bitmap transmitted to the UEs on the downlink is mapped to the resources employed by the UEs for their uplink communications. These resources can be persistently assigned to respective UEs in accordance with a further aspect. If the resources are not persistently assigned, the power control bits can be included in uplink grants wherein 502 would accordingly be an assignment message. In addition to persistently scheduled resources, power control bitmap could also be utilized for implicitly scheduled retransmissions, where instead of UL grants, PHICH is used to negatively acknowledge PUSCH transmission and implicitly schedule retransmission on the same virtual resources. Although it has been illustrated that a single message comprising a single bit for controlling power of each terminal is transmitted simultaneously to all the terminals, it can be appreciated that this is not necessary. Separate control messages can be transmitted to each of the UEs wherein each message carries power control bits for individual UEs as seen in further detail infra.

FIG. 5B relates to another aspect wherein more than one resource block is employed by a UE for transmission of its uplink communications. A UE I can employ two resource blocks (1 and 2) while UE II can employ resource blocks 3 and 4 (RB 3, RB 4) for their respective uplink transmissions. Accordingly, two bits are used for controlling transmission power of the UEs. In this figure, 512 is the control channel message including a message type field 514, a bitmap 516, and a cyclic redundancy check (CRC) field 518. Employing more than 1 bit in the message permits the base station better control of power in terms of granularity that can be achieved as two bits can correspond to $2^2=4$ levels of power. Similarly, depending on the number of resource blocks used by a terminal for its uplink transmission, a base station can use as many bits to manipulate power of a UE thereby achieving greater control.

Figure 5C:
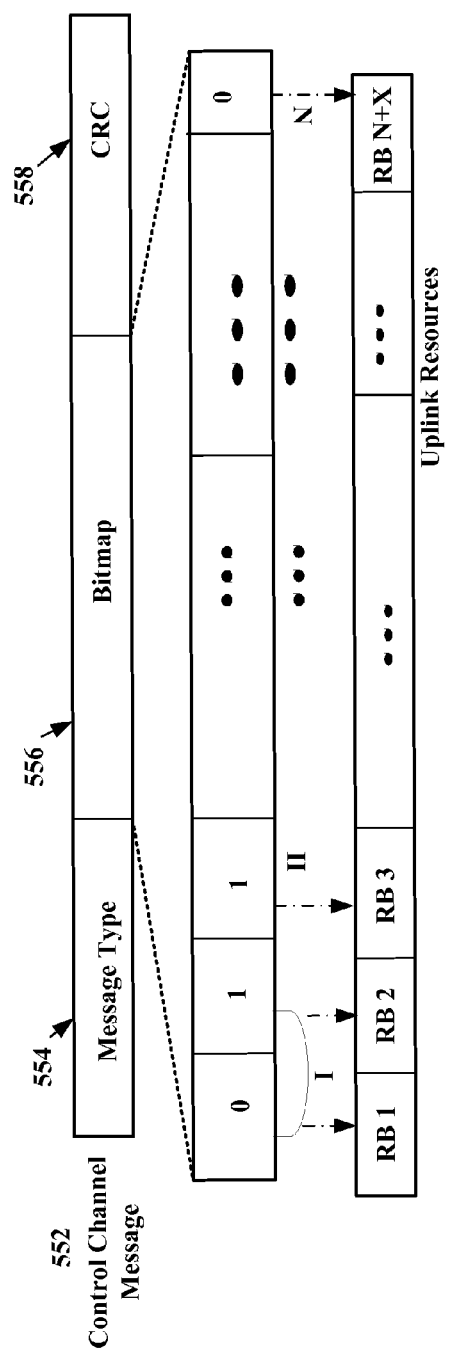
FIG. 5C relates to yet another aspect wherein different access terminals employ varying number of resource blocks for their uplink communications.

FIG. 5C relates to yet another aspect wherein different UEs employ varying number of resource blocks for their uplink communications. In particular, it is a schematic diagram of a power control message transmitted to a plurality of UEs I, II, . . . N wherein the location of the power control bits for each of the UEs is mapped to the resources on which the respective terminals transmit their uplink communications. In the figure, 552 is a control channel message carrying power control bits for the terminals I, II, . . . N. In this embodiment, control message 552 includes a message type field 554, a bitmap 556, and a cyclic redundancy check (CRC) field 558. The message type field 554 carries a specific value to identify this message as a control channel message, the bitmap field 554 comprises a bitmap that carries power control bits for each of the associated UEs while the CRC field is used by the UEs to verify if the control channel message has been correctly decoded. As seen in the figure, UE I has two resource blocks assigned to it and therefore, two bits are used for power control of UE I. UE II has only one resource block assigned to it and has only one bit for controlling its transmission power. Accordingly, the control channel message 552 is transmitted with a number of bits N+X>N wherein each of the I, II, . . . N UEs can have different number of bits associated with its power control. This permits the serving base station to have different power correction steps for different UEs based on the number of resources they employ for their uplink transmissions. Accordingly, the base station can have better control over transmission power levels of UEs using more resources. As mentioned supra, the location of the power control bits in the bitmap transmitted to the UEs on the downlink is mapped to the resources employed by the UEs for their uplink communications. Therefore, various UEs can decode the number of bits and the location of the bits within the bitmap and adjust their transmission power accordingly.

Figure 5D:
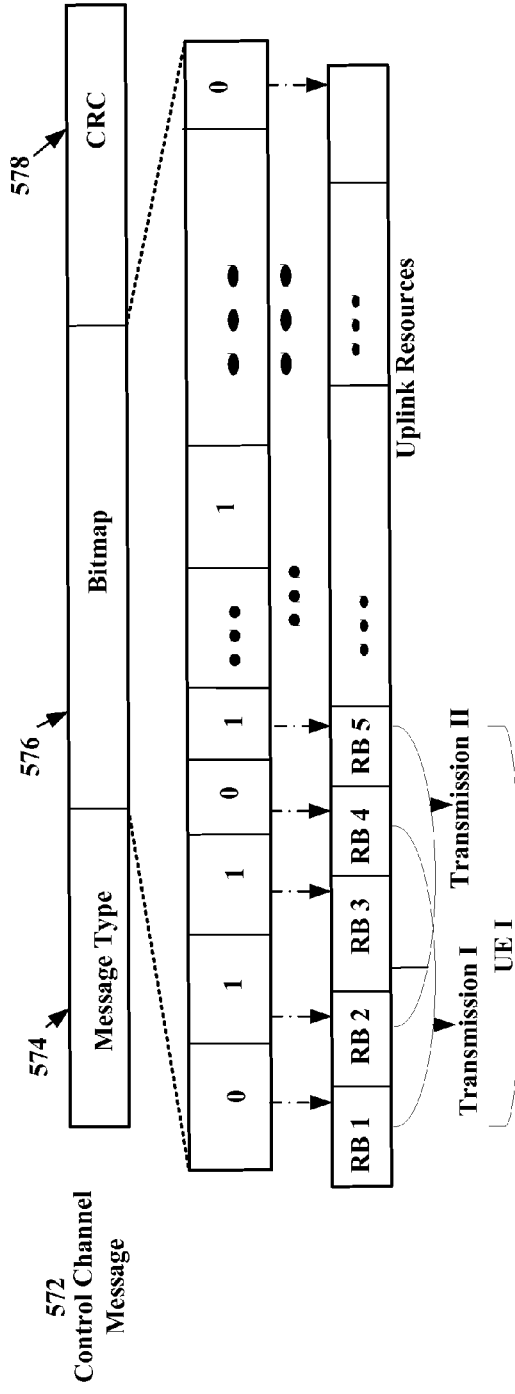
FIG. 5D illustrates another aspect related to transmitting power control message when an UE is transmitting a plurality of data streams in accordance with a MC-FDMA scheme.

FIG. 5D illustrates another aspect related to transmitting power control message when an UE is transmitting a plurality of data streams in accordance with a MC-OFDMA scheme. A data stream can comprise audio/video/user data generated at the UE. Accordingly, it may use continuous or discontinuous resource blocks for transmitting on the uplink and the power control bits can be located in contiguous positions or at discontinuous positions within the bitmap conveying the power control message to the UE. In addition, each data stream can be using a different number of resource blocks for its transmissions. Therefore, a different number of bits can be associated with power control of resource blocks utilized by each data stream. However, as discussed supra, since the position of these bits in the downlink communication from a serving base station are mapped to the respective resource blocks used for uplink transmissions, the UE can decode the downlink control message and adjust its transmission power associated with the resource block(s) for each data stream accordingly.

In particular, FIG. 5D illustrates a downlink control message transmitted to a UE I which communicates on the uplink in accordance with a MC-FDMA mode utilizing a plurality of discontinuous resource blocks. As an example, it can employ two resource blocks (1 and 4) for one of its uplink transmissions (transmission I) while resource blocks (2, 3 and 5) are used for another uplink communication (transmission II) being transmitted on a difference frequency. Accordingly, two bits at the first and the fourth positions are used for controlling power of the UE for the communication utilizing the first and the fourth resource blocks while three bits at the second, third and fifth positions are utilized for controlling power of the transmissions utilizing the second, third and fifth resource blocks. In the figure a control message 572 is sent UE I wherein, the message includes a message type field 574, a bitmap 576, and a cyclic redundancy check (CRC) field 578. As discontinuous resource blocks are used for transmitting on the uplink, bits whose positions are non-contiguous are used for controlling power of respective transmissions. However, as the position of these bits in the bitmap are associated with the resource blocks used for uplink communications, UE I can decode and appropriately adjust power of its various data streams based on their positions. It can be appreciated that a single control message may be transmitted to a plurality of UEs wherein one or more terminals can be transmitting a plurality of data streams. Therefore, the remaining bits within the message can be associated with power control of other UEs. The transmission power of each of these data streams can be controlled by the power control message by its bits whose position in the message is mapped to the resources utilized by the various uplink data streams originating from the one or more UEs. In addition, the aforementioned aspects can be applicable to both persistent and non-persistent assignments. For non-persistent assignments, the power control commands can be embedded in uplink grants.

Although the embodiments described herein have illustrated that the power control commands are carried to the UEs via bitmaps, it can be appreciated that this is not necessary. Other forms of power control communications wherein the location of the power control messages for respective UEs are mapped to the resources used by them for their uplink communications are possible as further detailed infra. In accordance with the aspects described supra, while a bitmap can be used to transmit power control commands to a plurality of UEs, more efficient means of transmitting these commands individually can be explored. A bitmap can convey individual power control commands separately to a single UE, however, as it is statically configured with predetermined number of bits it utilizes same amount of resources regardless of the number of UEs being affected by it. Such a static process tends to waste resources especially if other UEs do not require any adjustment of their transmission power.

The disadvantages arising from use of bitmaps can be overcome by a more dynamic method of indexing resource blocks that need to be power controlled. Such a process also consumes resources for indexing. For example, information associated with sixteen UEs can be indexed using 4 bits. Therefore, for each UE a total of 6 bits are required wherein 4 bits are used for indexing while 2 bits can be used for power control commands. As such a method requires 6 bits in order to convey 2 bits of power control information, it can be less efficient or 3-4 times less indexed channels can be multiplexed. Similarly if the power control command is conveyed within a single bit, 5-7 times less indexed channels can be multiplexed. However, it provides the flexibility of transmitting power control commands to a subset of UEs as it permits statistical multiplexing whereas communication of power control information via bitmaps is more static. In a more detailed aspect, UEs can be divided into various groups based on their CQI (channel quality indicator) or radio conditions.

In addition to indexing individual resource blocks, another aspect relates to indexing assignment of resource blocks. For non-persistent assignments as discussed supra, such indexing can be included in the uplink grants.

Figure 6:
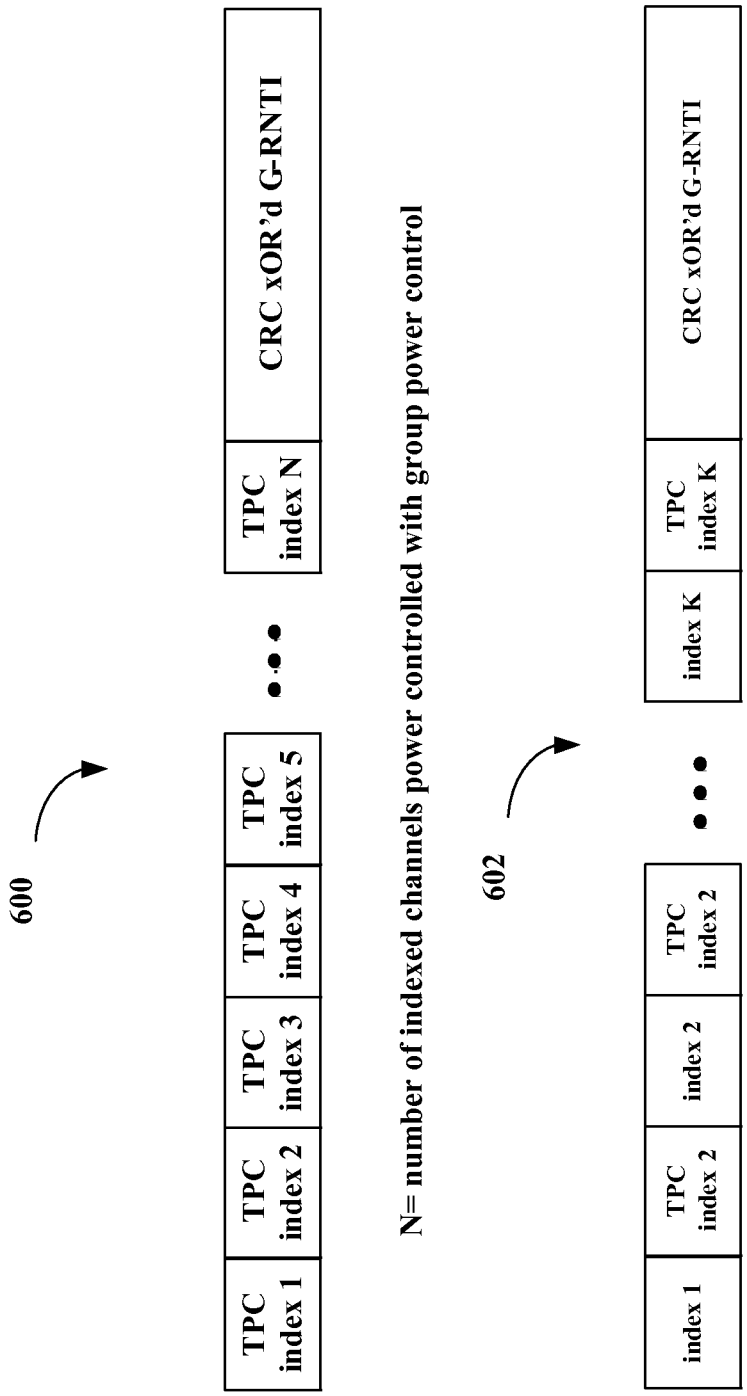
FIG. 6 relates to a methodology of transmitting power control message to one or more access terminals in accordance with an aspect.

Accordingly, FIG. 6 relates to another aspect of transmitting power control bits wherein uplink resources are indexed. A schematic diagram of a group power control command 600 is illustrated wherein the command is transmitted to a group of UEs which require adjustments to their transmission power wherein location of the TPC (transmit power control) command is mapped to indexed uplink resources used by the UEs. For example, PUCCH (Physical Uplink Control Channel) and persistent PUSCH (Physical Uplink Shared Channel) resource blocks are indexed when assigned with RRC (radio resource control). In the figure, each of the blocks indicates an indexed channel whose power is being adjusted via the group power control command. Therefore, N is the total number of indexed channels power controlled via the group power control command. This aspect relates to a static mapping of power control commands for a given group of UEs as all the UEs in the group have their power varied in accordance with the TPC command associated therewith.

Another aspect relates to a more dynamic mapping of power control commands for a group of access terminals wherein power of specific access terminals within the group can be controlled. A schematic diagram 602 illustrates the group power control command transmitted in accordance with this aspect. As mentioned supra, it can comprise 4-6 bits for indexing thereby facilitating statistical multiplexing and 2 bits for TPC commands. In the figure, index 1 indicates the 4-6 bit index which specifies the resource block to be controlled while TPC index 1 indicates the power control command that adjusts the power of the UE for transmissions utilizing the resource block associated with index 1. Therefore, K is the total number of indexed channels addressed by the group power control command 602. Thus, indexing persistently assigned resource blocks used for uplink communications and using them to map downlink power control commands can lead to a more dynamic method of signaling. It facilitates grouping UEs according to their radio conditions and transmitting a group power control command only to those UEs that require power correction. If a UE is assigned multiple indexed resources, a single indexed resource (for example the one with lowest index) is signaled in power control message for the UE to interpret the power control command. This leads to significant reduction in power overhead whereas a more static mapping leads to the group power control command being dimensioned with enough power to be transmitted to all UEs within a cell.

Figure 7:
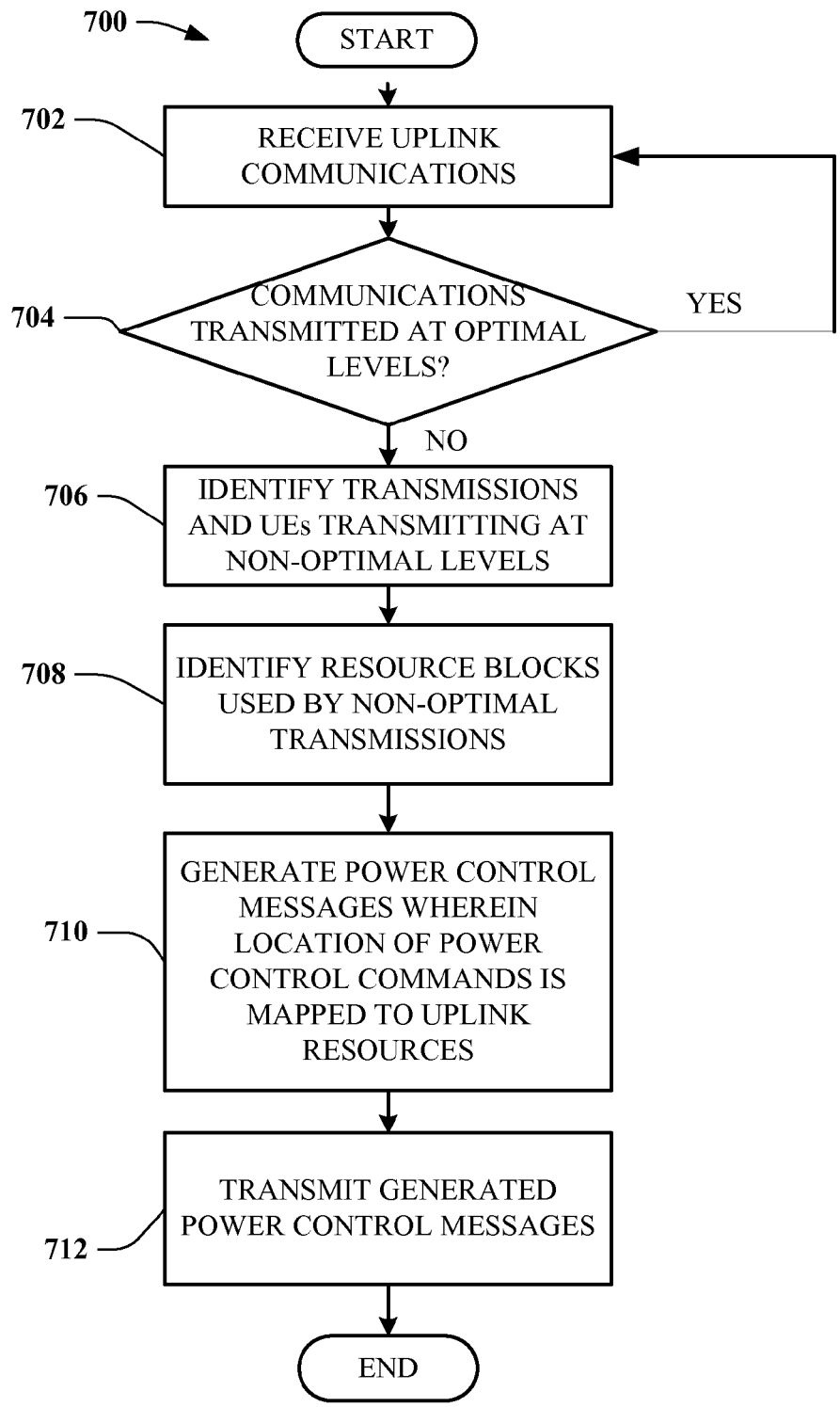
FIG. 7 relates to a methodology of transmitting power control message to one or more UEs in accordance with an aspect.

FIG. 7 relates to a methodology 700 of transmitting power control message to one or more UEs in accordance with an aspect. The procedure begins at 702 wherein a serving base station receives communications from a plurality of UEs. At 704, the various communications are analyzed to determine if they have been transmitted with optimum power. As mentioned supra, SNR of the received communications can be one of the attributes of the received communications that indicates the transmission power of the messages. Various other factors can also indicate the power with which the messages are transmitted by the UEs. For example, if the SNR of the received communications is very low then it can be concluded that the message was transmitted with low power and that the UE transmitting it should increase the power of its uplink communications. Similarly location of the UE can be another attribute to indicate a change in transmission power of the message. If it is detected that the UE is proximate to the base station then the transmission power of the UE may be reduced to conserve power. If the messages are all transmitted with optimum power then the procedure returns to receiving uplink communications which are being transmitted at optimum levels, else, the messages which have been transmitted with non-optimum power and the UEs transmitting them are identified at 706. At 708, the resource blocks used by these UEs for transmitting the messages are also identified. As detailed supra, depending on the mode of transmission, continuous or discontinuous resource blocks can be employed by the UEs for their uplink communications. At 710, one or more control messages to adjust power of those UEs transmitting at non-optimum power levels are formulated. In accordance with different aspects, a single power control message may be formulated for a plurality of UEs or individual messages may be composed for each of the UEs. Regardless of the number of messages, the location of the power control bits within these messages is mapped to the resources utilized by the UEs for their uplink communications. The messages are then communicated to the UEs on the downlink as shown at 712 in order to adjust their transmission power to more optimum levels. This method aids in assigning resources for power control messages dynamically based on the uplink communications. This is in contrast to more a static method of assigning these resources wherein the resources allocated for transmitting power control messages may be under utilized if the UEs are either not transmitting or are transmitting at optimum power levels.

Figure 8:
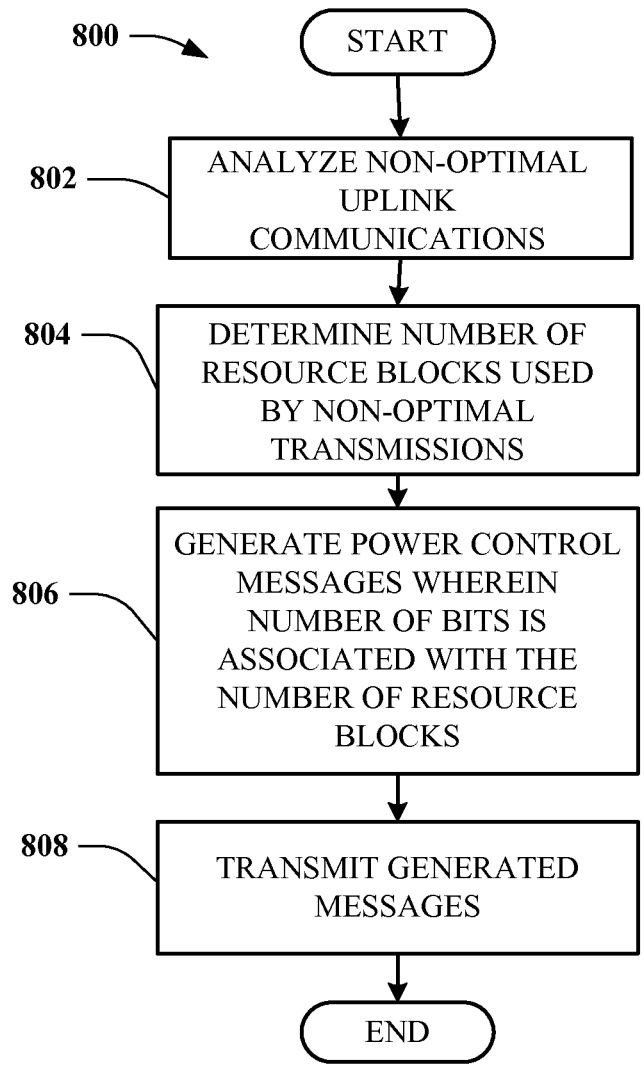
FIG. 8 relates to a more detailed aspect of generating power control messages for various UEs.

FIG. 8 relates to a more detailed aspect of generating power control messages for various UEs. The method 800 begins at 802 by analyzing communications received from each UE transmitting at non-optimum power levels. At 804 the number of resource blocks utilized by each UE for its uplink communications is identified. At 806, based on the analysis of step 802, power control commands to increase or decrease power are generated for each UE statically as bitmaps wherein the number of bits for controlling power of a given UE in the bitmap would depend on the number of resource blocks used by the UE for its uplink communications. In a different aspect, the power control messages can be generated more dynamically wherein indexed resources are employed for uplink communications and the control messages comprise indexing information in addition to the power control commands for respective resources. The power control commands thus generated are communicated to the UEs either in a common message for a plurality of UEs or as individual messages for each of the UEs as shown at 808.

In accordance with different aspects, an UE can be transmitting a plurality of data streams at different frequencies via adopting a MC-FDMA mode. In this case, the different data streams being transmitted at non-optimal power levels for each UE transmitting in a multi-carrier mode are identified. Additionally, the resource blocks utilized by the UEs for such data streams are also identified. In accordance with this aspect, it can be appreciated that some of the plurality of data streams may be transmitted at optimum power levels and hence do not need adjustments of power levels. Based upon the results obtained on analyzing different transmissions, appropriate power control commands are generated for data streams being transmitted at non-optimal power levels. In accordance with different aspects, a common message with the power control commands incorporated therein may be transmitted to a plurality of UEs or each UE may receive an exclusive message comprising its individual power control commands for adjusting power of its one or more data streams.

Figure 9:
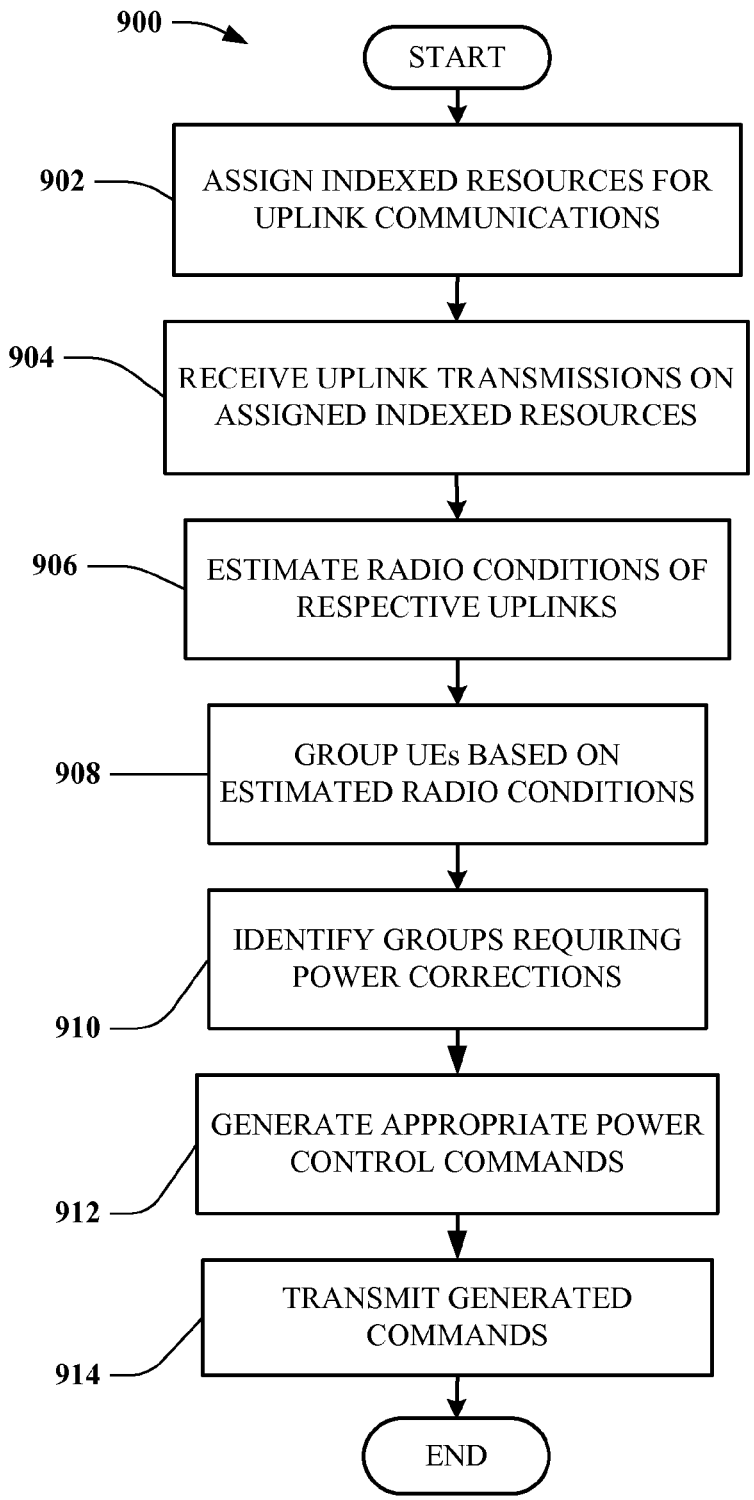
FIG. 9 is associated with a methodology of transmitting power control commands using indexing as described herein.

FIG. 9 is associated with a methodology 900 of transmitting power control commands using indexing as described herein. The method begins at 902 wherein UEs are assigned resources for uplink communications. These resources can be assigned persistently or non-persistently. Regardless of the type of assignment, the resources can be indexed either individually or an assignment of a group of resource blocks can be indexed in accordance with different aspects. At 904, uplink communications are received from the different UEs that were assigned indexed resources as described at 902. At 906, the radio conditions associated with the received communications are estimated. For example, as detailed supra, SNR can be used as one of the attributes to determine the radio conditions. Based at least on the estimated radio conditions, the UEs are grouped into different groups as shown at 908. For example, UEs with good conditions that do not need any changes in their transmission power can be classified under one group whereas other UEs that may require adjustments to their power can be placed in another group. Among such groups requiring power corrections, different groups can be formed based on the kind of power adjustments that are required. Within such groups, those groups of UEs requiring power corrections are identified at 910 and appropriate power control commands are generated as shown at 912 such that their position within the power control messages is mapped to the resource blocks used by respective communications for their uplink transmissions. The generated power control messages for different communications are transmitted on the downlink as shown at 914. However, as the resource blocks are indexed, the power control commands transmitted on the downlink comprise information (or bits) associated with the indexing of the resource blocks in addition to those conveying the power control commands.

Conventionally, transmitting minimum number of bits is encouraged in order to reduce usage of resources. However, the aforementioned aspects offset the cost of greater resources required for transmitting higher number of bits by the unexpected benefits associated with dynamic aspects of such signaling. As mentioned supra, indexing resource blocks facilitates grouping UEs based on their radio conditions thereby permitting transmission of power control commands aperiodically to only for those UEs requiring power corrections. Thus, no resources are wasted in transmitting any communications to UEs already operating at optimal power levels.

Figure 10:
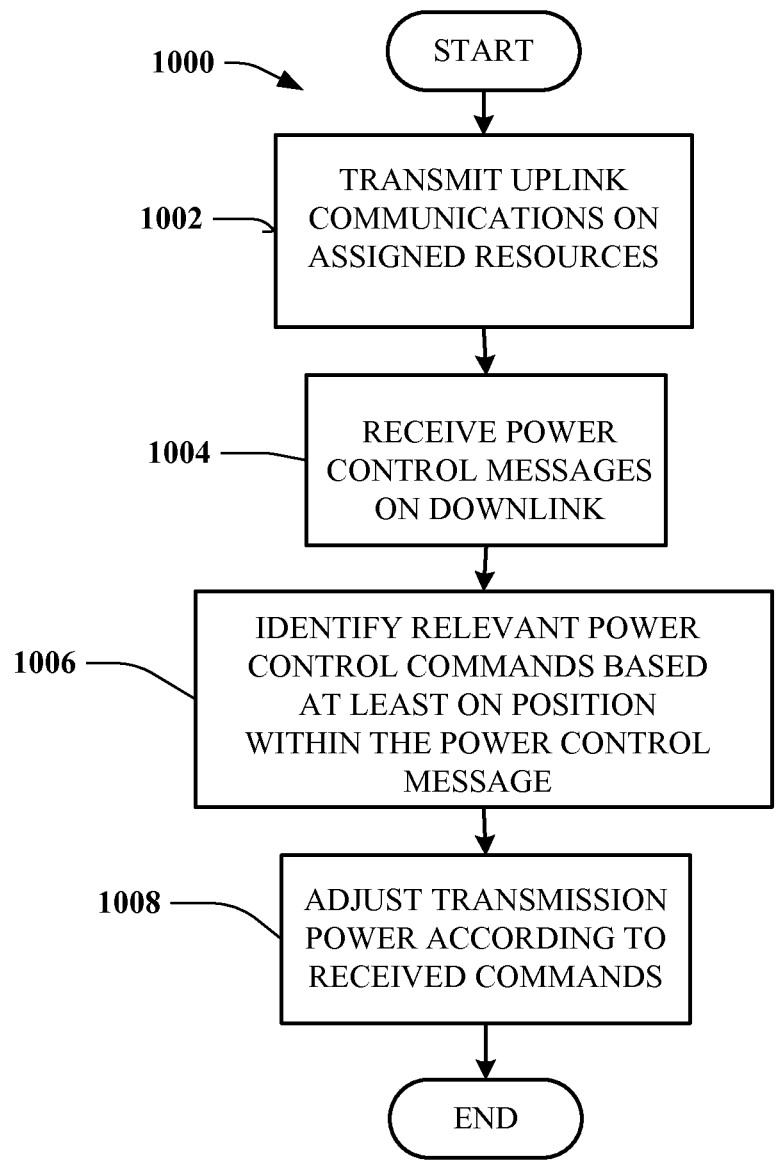
FIG. 10 is a flow chart detailing a method of adjusting power at the UEs based on the received commands.

FIG. 10 is a flow chart 1000 detailing a method of adjusting power at the UEs based on the received commands. The procedure begins at 1002 wherein an UE transmits uplink communications on assigned resources to a serving base station. At 1004, it can receive communications from the base station on the downlink wherein the communications can relate to controlling power at the UE. At 1006, the received messages are decoded and if they are associated with controlling transmission power of the UEs, the relevant commands are identified. In accordance with an aspect, the location of power control commands in the messages transmitted on the downlink is mapped to the resources utilized by the UE for its uplink communications. If the UE is transmitting a plurality of data streams at different frequencies, then the power control commands for one or more of the data streams are transmitted in a manner that is mapped to the resource blocks used by the one or more data streams for their uplink communications. This facilitates the UE to recognize the appropriate power control commands and adjust its transmission power on the uplink accordingly as shown at 1008.

Figure 11:
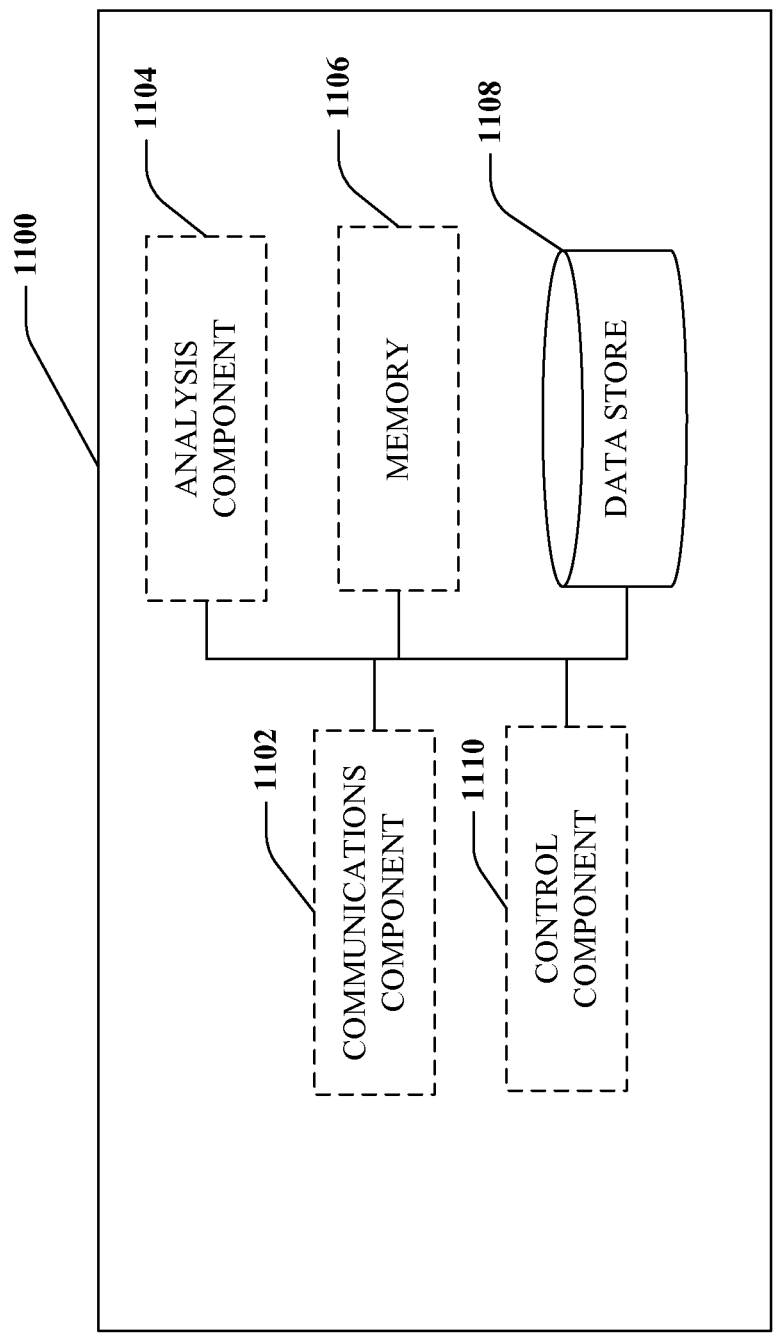
FIG. 11 illustrates a high-level system diagram of various components of a device in accordance with various aspects.

FIG. 11 illustrates a high-level system diagram of various components of a device in accordance with various aspects. It is to be appreciated that the device 1100 may be an eNode B, a UE, or a combination thereof. It comprises a communications component 1102 that facilitates receiving and transmitting communications to various entities utilizing hardware, software, and services as described herein. Although the communications component 1102 is depicted as a single entity, it may be appreciated separate transmission and reception components can be employed for sending and receiving communications. In accordance with an aspect the device 1100 can act as an eNode B and the communications component 1102 receives communications from various UEs relating to one or more of resource requests, data transmissions etc. An analysis component 1104 analyzes the communications received from the various entities including a plurality of UEs to identify the entities. In accordance with an aspect, communications received from UEs are analyzed to determine the resource blocks used by the terminals for transmitting their respective uplink communications. Additionally, the analysis component can also analyze the communications to determine if the communications are being transmitted at optimum power levels. Although it has been illustrated that a single entity executes the analysis process to determine various aspects of the communications, it may be appreciated that more than one entity can be employed for different analysis procedures. The analysis component 1104 can include a single or multiple set of processors or multi-core processors wherein the processors can carry out other operations such as grouping UEs based on their similar radio conditions or generating indexing information for the resources assigned to the UEs or other functions. Moreover, the analysis component 1104 can be implemented as an integrated processing system and/or a distributed processing system. The information gathered by the analysis component 1104 can be stored in the memory 1106/data store 1108 for further processing. Memory 1106 can include random access memory (RAM), read only memory (ROM), or a combination thereof. Data store 1108 can be any suitable combination of hardware and/or software that provides for mass storage of information, databases, and programs employed in connection with aspects described herein. The control component 1110 utilizes the information regarding the resource blocks employed by respective UEs on their uplink communications to form control messages for UEs that may be transmitting at non-optimal power levels. As detailed supra, the control component can generate a single message for a plurality of terminals or it can generate individual messages for each terminal. The messages can be stored in the memory 1106 or data store 1108 for transmitting to the UEs by the communications component 1102.

Figure 12:
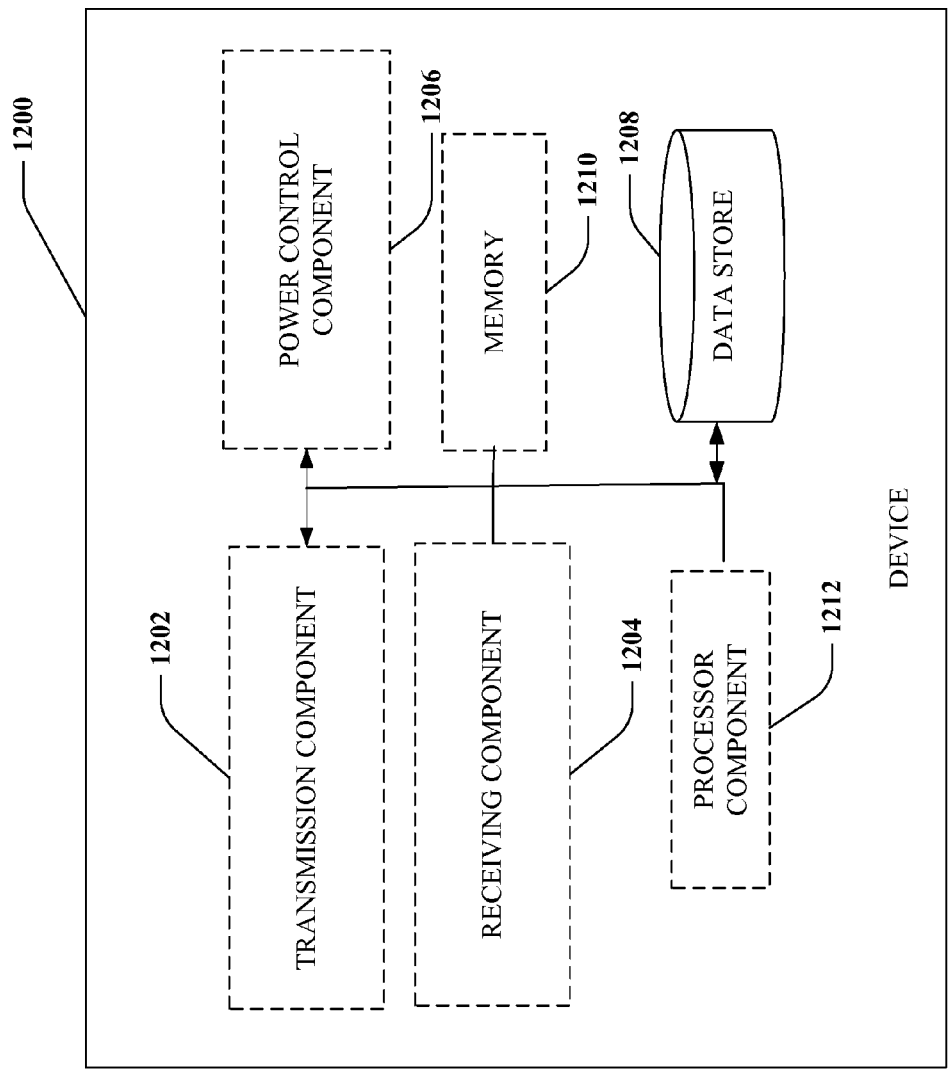
FIG. 12 is another high level diagram illustrating various components of a device in accordance with different aspects described herein.

FIG. 12 is another high level diagram illustrating various components of a device 1200 in accordance with different aspects described herein. The device 1200 can be an eNode B, an UE or a combination thereof. The device comprises a transmission component 1202 for transmitting various communications. If the device is acting as an UE then the transmission component 1202 can transmit various communications on the uplink to a serving eNode B/base station. The communications can include resource requests, data transmission on assigned resources etc. The device also comprises a receiving component 1204 for receiving communications from various entities including eNode B, other UEs etc. Upon transmission of resource requests, the receiving component can receive control messages relating to assignment of resources for uplink communications or data transmissions. In accordance with an aspect, the receiving component 1204 can receive control messages related to adjusting power of the UE based on the attributes of its uplink communications. These messages can be stored in the data store 1206. Data store 1208 can be any suitable combination of hardware and/or software that provides for mass storage of information, databases, and programs employed in connection with aspects described herein. The device 1200 may optionally comprise a volatile/non-volatile memory 1210 including random access memory (RAM), read only memory (ROM), or a combination thereof. These messages are decoded and processed by a processing component 1212. In accordance with an aspect, the power control messages received from a serving base station/eNode B can be decoded and processed in order to identify the power control information. As detailed supra, these messages can have power control bits at locations within the message mapped to specific resource blocks employed by the device 1200 for its uplink communications. The information decoded from such power control messages can be stored in the memory 1210 and/or data store 1208 and employed by the power control module 1206 to adjust the power of the device 1200 in accordance with the appropriate power control bits transmitted in these messages.

Next, systems that can enable aspects of the disclosed subject matter are described in connection with FIGS. 13 and 14. Such systems can include functional blocks, which can be functional blocks that represent functions implemented by a processor or an electronic machine, software, or combination thereof (e.g., firmware).

Figure 13:
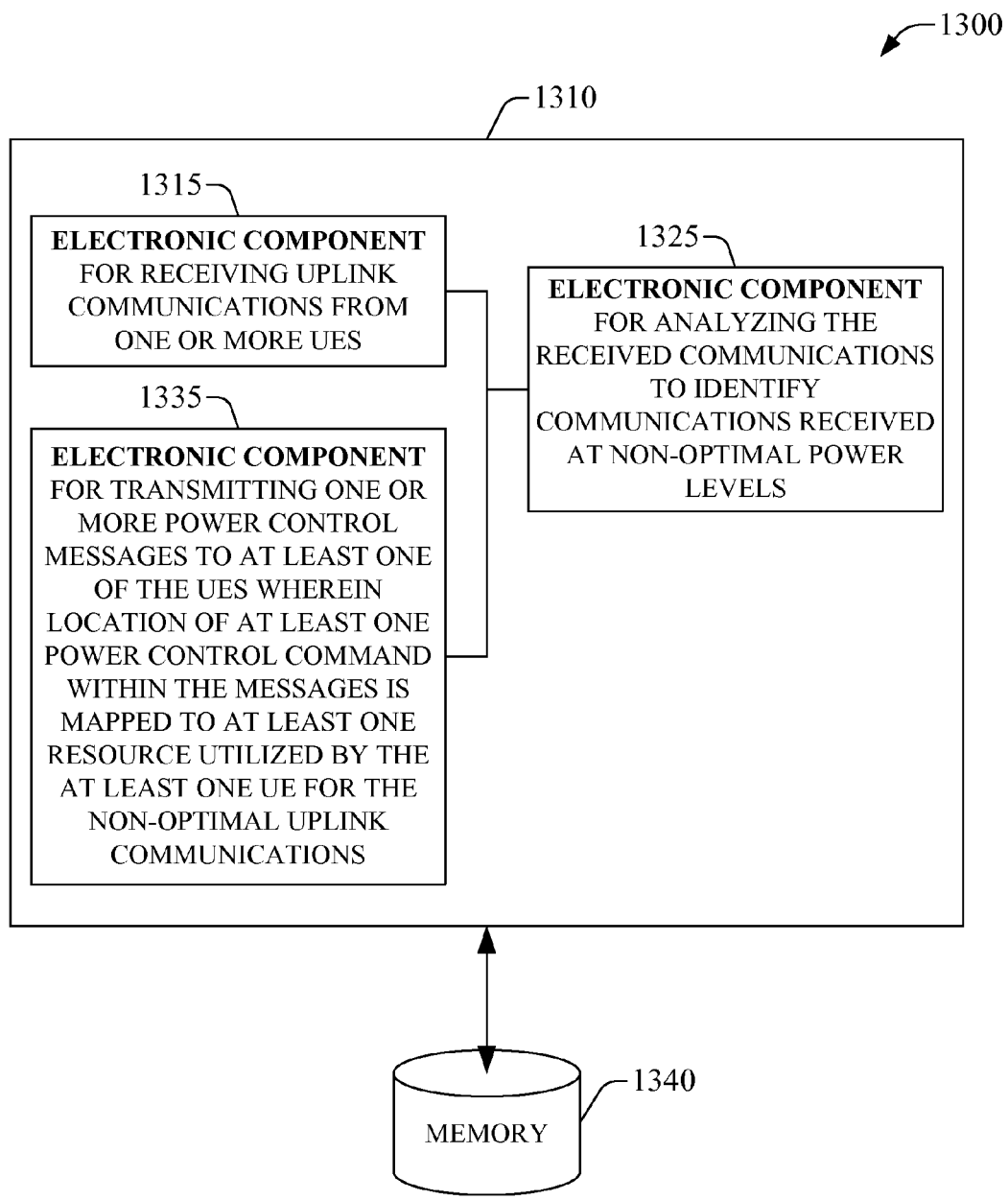
FIG. 13 illustrates a block diagram of an example system that enables communication of power control information in accordance with aspects disclosed in the subject specification.

FIG. 13 illustrates a block diagram of an example system 1300 that enables communication of power control information in accordance with aspects disclosed in the subject specification. System 1300 can reside at least partially within a base station, for example. System 1300 includes a logical grouping 1310 of electronic components that can act in conjunction. In an aspect of the subject innovation, logical grouping 1310 includes an electronic component 1315 for receiving uplink communications from one or more UEs; an electronic component 1325 for analyzing the received communications to identify communications received at non-optimal power levels; and an electronic component 1335 for transmitting one or more power control messages to at least one of the UEs wherein location of at least one power control command within the messages is mapped to at least one resource utilized by the at least one UE for the non-optimal uplink communications.

System 1300 can also include a memory 1340 that retains instructions for executing functions associated with electrical components 1315, 1325, and 1235, as well as measured or computed data that may be generated during executing such functions. While shown as being external to memory 1340, it is to be understood that one or more of electronic components 1315, 1325, and 1335, and can exist within memory 1340.

Figure 14:
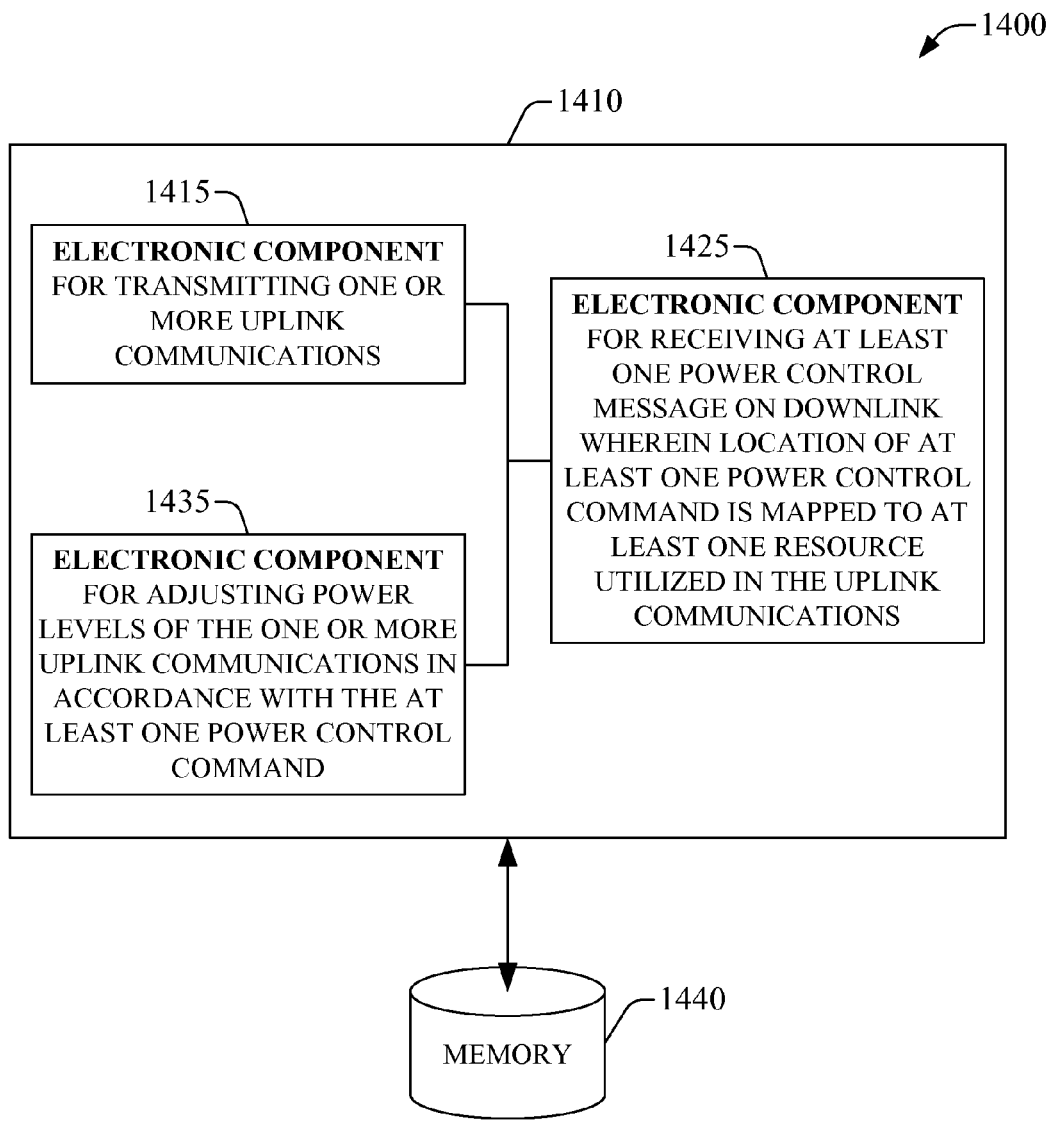
FIG. 14 illustrates a block diagram of an example system that enables adjustment of power within a wireless communication system in accordance with aspect described in the subject specification.

FIG. 14 illustrates a block diagram of an example system 1400 that enables adjustment of power within a wireless communication system in accordance with aspect described in the subject specification. System 1400 can reside at least partially within a mobile, for example. System 1400 includes a logical grouping 1410 of electronic components that can act in conjunction. In an aspect of the subject innovation, logical grouping 1410 includes an electronic component 1415 for transmitting one or more uplink communications; an electronic component 1425 for receiving at least one power control message on downlink wherein location of at least one power control command is mapped to at least one resource utilized in the uplink communications; and an electronic component 1435 for adjusting power levels of the one or more uplink communications in accordance with the at least one power control command.

System 1400 can also include a memory 1440 that retains instructions for executing functions associated with electrical components 1415, 1425 and 1435, as well as measured or computed data that may be generated during executing such functions. While shown as being external to memory 1440, it is to be understood that one or more of electronic components 1415, 1425 and 1435, and can exist within The data transmission techniques described herein may be implemented by various means. For example, these techniques may be implemented in hardware, firmware, software, or a combination thereof. For a hardware implementation, the processing units used for data transmission at a transmitter or data reception at a receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory and executed by a processor. The memory may be implemented within the processor or external to the processor.

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for controlling power within a wireless communication system, the method comprising:
    receiving uplink communications from a plurality of user equipments (UEs);
    determining that the uplink communications have been transmitted at a non-optimal power level by comparing one or more attributes associated with the uplink communications to thresholds for the one or more attributes;
    determining the identity and number of resource blocks employed by each UE of the plurality of UEs that transmitted the uplink communications at the non-optimal power level;
    generating power control messages for the plurality of UEs, wherein positions of power control commands within the power control messages are mapped respectively to the identified resource blocks employed by the plurality of UEs that transmitted the uplink communications at the non-optimal power level, and wherein a number of power control commands for controlling power of a respective UE is equal to the number of resource blocks determined to be employed by the respective UE for its uplink transmissions; and
    transmitting the power control messages to the plurality of UEs.

2. The method of claim 1, wherein the power control messages comprise a bitmap that communicates the power control commands.

3. The method of claim 2, wherein the power control commands are bits within the bitmap and a location of the bits within the bitmap is mapped to the resource blocks employed by the respective UEs.

4. The method of claim 3, wherein a number of bits for controlling power of the respective UE is associated with the number of resource blocks utilized by the respective UE for its uplink communications.

5. The method of claim 1, wherein the transmitting the power control messages comprises transmitting at least one common power control message to the plurality of UEs.

6. The method of claim 1, wherein the transmitting the power control messages comprises transmitting individual power control messages comprising power control bits to each of the UEs.

7. The method of claim 1, further comprising indexing the resource blocks employed by the respective UEs.

8. The method of claim 7, wherein the power control messages comprise bits associated with the indexed resource blocks in addition to bits associated with the power control commands.

9. The method of claim 7, further comprising grouping the UEs based at least on their estimated radio conditions.

10. The method of claim 9, wherein the transmitting the power control messages comprises transmitting group power control commands to one or more of the UE groups.

11. The method of claim 1, wherein at least one of the UEs transmits a plurality of data streams concurrently at different frequencies and the power control messages individually adjust power of the resource blocks employed for the data streams being transmitted at the non-optimal power level.

12. An apparatus for conveying power control information within a communication system, the apparatus comprising:
    at least one processor configured to:
        receive uplink communications from a plurality of user equipments (UEs),
        determine that the uplink communications have been transmitted at a non-optimal power level by comparing one or more attributes associated with the uplink communications to thresholds for the one or more attributes, determine the identity and number of resource blocks employed by each UE of the plurality of UEs that transmitted the uplink communications at the non-optimal power level, generate power control messages for the plurality of UEs, wherein positions of power control commands within the power control messages are mapped respectively to the identified resource blocks employed by the plurality of UEs that transmitted the uplink communications at the non-optimal power level, and wherein a number of power control commands for controlling power of a respective UE is equal to the number of resource blocks determined to be employed by the respective UE for its uplink transmissions and transmit the power control messages to the plurality of UEs; and a memory coupled to the at least one processor.

13. A computer program product comprising:
a non-transitory computer-readable medium comprising:
code for causing at least one computer to receive uplink communications from a plurality of user equipments (UEs), code for causing the at least one computer to determine that the uplink communications have been transmitted at a non-optimal power level by comparing one or more attributes associated with the uplink communications to thresholds for the one or more attributes, code for causing the at least one computer to determine the identity and number of resource blocks employed by each UE of the plurality of UEs that transmitted the uplink communications at the non-optimal power level, code for causing the at least one computer to generate power control messages for the plurality of UEs, wherein positions of power control commands within the power control messages are mapped respectively to the identified resource blocks employed by the plurality of UEs that transmitted the uplink communications at the non-optimal power level, and wherein a number of power control commands for controlling power of a respective UE is equal to the number of resource blocks determined to be employed by the respective UE for its uplink transmissions, and code for causing the at least one computer to transmit the power control messages to the plurality of UEs.

14. A wireless communications apparatus for communicating power control information, the system comprising:
means for receiving uplink communications from a plurality of user equipments (UEs);
means for determining that the uplink communications have been transmitted at a non-optimal power level by comparing one or more attributes associated with the uplink communications to thresholds for the one or more attributes;
means for determining the identity and number of resource blocks employed by UE of the plurality of UEs that transmitted the uplink communications at the non-optimal power level;
means for generating power control messages for the plurality of UEs, wherein positions of power control commands within the power control messages are mapped respectively to the identified resource blocks employed by the plurality of UEs that transmitted the uplink communications at the non-optimal power level, and wherein a number of power control commands for controlling power of a respective UE is equal to the number of resource blocks determined to be employed by the respective UE for its uplink transmissions; and means for transmitting the power control messages to the plurality of UEs.

15. A method of receiving power control commands, the method comprising:
transmitting one or more uplink communications using a first number of resource blocks;
receiving at least one power control message on a downlink when the one or more uplink communications is determined to be transmitted at a non-optimal power level by a comparison of one or more attributes associated with the uplink communications to thresholds for the one or more attributes, wherein the at least one power control message includes a second number of power control messages equal to the first number of resource blocks based on a determination of the first number of resource blocks, and wherein at least one location of the second number of power control commands within the at least one power control message is mapped to the first number of resource blocks utilized for transmitting the one or more uplink communications at the non-optimal power level; and
adjusting power levels of the one or more uplink communications in accordance with the at least one power control command.

16. The method of claim 15, wherein the transmitting the one or more uplink communications comprises transmitting a plurality of uplink communications concurrently at different frequencies on a plurality of resource blocks at a non-optimal power level.

17. The method of claim 16, wherein the received power control message comprises a plurality of power control commands, wherein a location of the power control commands within the received message is mapped to the plurality of resource blocks used for the non-optimal uplink communications.

18. The method of claim 15, wherein the resource blocks utilized for the uplink communications are indexed.

19. The method of claim 18, further comprising associating with a group of UEs based at least upon radio conditions.

20. The method of claim 19, wherein the receiving the power control message comprises receiving a group power control message that includes power control commands in the group in addition to indexing information associated with the resource blocks utilized by the UEs for the uplink communications.

21. An apparatus for adjusting transmission power levels within a communication system, the apparatus comprising:
at least one processor configured to:
transmit one or more uplink communications at a non-optimal power level using a first number of resource blocks,
receive at least one power control message when the one or more uplink communications is determined to be transmitted at the non-optimal power level by a comparison of one or more attributes associated with the uplink communications to thresholds for the one or more attributes, wherein the at least one power control message includes a second number of power control messages equal to the first number of resource blocks based on a determination of the first number of resource blocks, and wherein at least one location of the second number of power control commands within the at least one power control message is mapped to the first number of resource blocks utilized for transmitting the one or more non-optimal uplink communications at the non-optimal power level, and adjust power levels of the one or more uplink communications in accordance with the at least one power control command; and a memory coupled to the at least one processor.

22. A computer program product comprising:

a non-transitory computer-readable medium comprising:

code for causing at least one computer to transmit one or more uplink communications using a first number of resource blocks;

code for causing the at least one computer to receive at least one power control message on a downlink when the one or more uplink communications is determined to be transmitted at a non-optimal power level by a comparison of one or more attributes associated with the uplink communications to thresholds for the one or more attributes, wherein the at least one power control message includes a second number of power control messages equal to the first number of resource blocks based on a determination of the first number of resource blocks, and wherein at least one location of the second number of power control commands within the at least one power control message is mapped to the first number of resource blocks utilized for transmitting the one or more uplink communications at the non-optimal power level; and code for causing the at least one computer to adjust power levels of the one or more uplink communications in accordance with the at least one power control command.

23. An apparatus for adjusting power within a wireless communication system, the apparatus comprising:

means for transmitting one or more uplink communications using a first number of resource blocks;

means for receiving at least one power control message on a downlink when the one or more uplink communications is determined to be transmitted at a non-optimal power level by a comparison of one or more attributes associated with the uplink communications to thresholds for the one or more attributes, wherein the at least one power control message includes a second number of power control messages equal to the first number of resource blocks based on a determination of the first number of resource blocks, and wherein at least one location of the second number of power control commands within the at least one power control message is mapped to the first number of resource blocks utilized for transmitting the one or more uplink communications at the non-optimal power level; and means for adjusting power levels of the one or more uplink communications in accordance with the at least one power control command.

* * * * *